(12) United States Patent
Sasaki

(10) Patent No.: US 7,001,031 B2
(45) Date of Patent: Feb. 21, 2006

(54) IMAGE-FORMING OPTICAL SYSTEM, PROJECTION TYPE IMAGE DISPLAY APPARATUS AND IMAGE PICKUP APPARATUS

(75) Inventor: Kenichi Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 10/209,322

(22) Filed: Jul. 31, 2002

(65) Prior Publication Data

US 2003/0035232 A1   Feb. 20, 2003

(30) Foreign Application Priority Data

Aug. 3, 2001   (JP) .............................. 2001-236907

(51) Int. Cl.
G02B 5/10   (2006.01)
(52) U.S. Cl. ...................... 359/859; 359/850; 359/857; 359/858; 359/861
(58) Field of Classification Search ........ 359/857–861, 359/850
See application file for complete search history.

(56) References Cited

U.S. PATENT DOCUMENTS

| | | | | |
|---|---|---|---|---|
| 5,671,993 A * | 9/1997 | Shikama | ...................... | 353/77 |
| 5,825,560 A | 10/1998 | Ogura et al. | ................. | 359/822 |
| 5,847,887 A | 12/1998 | Ogura et al. | ................. | 359/822 |
| 5,973,858 A | 10/1999 | Sekita | ......................... | 359/729 |
| 5,995,287 A | 11/1999 | Sekita | ......................... | 359/599 |
| 5,999,311 A | 12/1999 | Nanba et al. | ................. | 359/365 |
| 6,021,004 A | 2/2000 | Sekita et al. | ................. | 359/676 |
| 6,097,550 A | 8/2000 | Kimura | ....................... | 359/729 |
| 6,124,986 A | 9/2000 | Sekita et al. | ................. | 359/691 |
| 6,163,400 A | 12/2000 | Nanba | ........................ | 359/365 |
| 6,166,866 A | 12/2000 | Kimura et al. | .............. | 359/729 |
| 6,172,825 B1 * | 1/2001 | Takahashi | ................... | 359/859 |
| 6,181,470 B1 | 1/2001 | Sekita | ......................... | 359/364 |
| 6,215,596 B1 | 4/2001 | Araki et al. | ................. | 359/631 |
| 6,268,963 B1 | 7/2001 | Akiyama | ..................... | 359/631 |
| 6,270,224 B1 | 8/2001 | Sunaga et al. | .............. | 359/857 |
| 6,278,553 B1 | 8/2001 | Akiyama | ..................... | 359/627 |
| 6,292,309 B1 | 9/2001 | Sekita et al. | ................. | 359/729 |
| 6,318,869 B1 * | 11/2001 | Hudyma | ....................... | 359/857 |
| 6,366,411 B1 | 4/2002 | Kimura et al. | .............. | 359/729 |

FOREIGN PATENT DOCUMENTS

| | | |
|---|---|---|
| JP | 8-292371 | 11/1996 |
| JP | 8-292372 | 11/1996 |
| WO | WO 97/01787 | 1/1997 |

* cited by examiner

Primary Examiner—Euncha P. Cherry
Assistant Examiner—Joshua L. Pritchett
(74) Attorney, Agent, or Firm—Morgan L. Finnegan, L.L.P.

(57) ABSTRACT

The present invention discloses an image-forming optical system provided with a plurality of curved mirrors whereby two points at different distances are made to have an optically conjugate relationship, sequentially starting with a first conjugate point which is nearer when an optical path is traced from the first conjugate point to a second conjugate point which is farther, comprises, a first mirror which reflects luminous flux from the first conjugate point to transform the luminous flux into substantially parallel luminous flux, and a second mirror which reflects the luminous flux reflected by the first mirror while keeping the luminous flux substantially parallel. Further, the optical system satisfies the following condition:

$|\text{Arctan}(1/2F) - |2 \times (\xi - \eta)|| \leq 10 [\text{deg}]$

8 Claims, 4 Drawing Sheets

IMAGE-FORMING OPTICAL SYSTEM, PROJECTION TYPE IMAGE DISPLAY APPARATUS AND IMAGE PICKUP APPARATUS

BACKGROUND OF THE INVENTION

1. Field of the Invention

The present invention relates to an image-forming optical system used for a projection type image display apparatus such as a projector and an image pickup apparatus such as a camera.

2. Description of the Related Art

A projection type image display apparatus displays an image by illuminating an image display element such as a liquid crystal panel or digital micro mirror device with luminous flux from a light source and enlarging/projecting transmitted light or reflected light modulated by the image display element on a screen, etc. using a projection lens.

FIG. 4 shows a projection optical system disclosed in International Publication No. WO97/01787, which relates to patents to be republished. In this optical system, luminous flux emitted from a light source 101a is reflected by reflection mirrors such as illumination optical systems 101b, 101c and 101d and incident upon a reflection type image display panel 102. Then, the luminous flux modulated and reflected by the image display panel 102 is reflected by mirrors 103a, 103b, 103d, 103e and a flat mirror 103f which are capable of image-forming, and diagonally projected onto a screen 104.

On the other hand, various image-forming optical systems using a decentered optical system aiming at miniaturization of the entire optical system have been recently proposed. A decentered optical system introduces a concept called a "reference optical axis" and can construct an optical system with aberration sufficiently corrected by forming a rotationally asymmetric aspherical surface or so-called free form surface. For example, Japanese Patent Laid-Open No. 9-5650 proposes the design method and Japanese Patent Laid-Open No. 8-292371 and Japanese Patent Laid-Open No. 8-292372 propose design examples thereof.

When an off-axial optical system, that is, a reference optical axis along the ray penetrating the center of an object (or the center of an image) and the center of the pupil is considered, this decentered optical system is defined as an optical system including an off-axial curved surface where the plane normal at the intersection with the reference optical axis of the configured surface is not on the optical axis and is referred to as an optical system with a folded reference optical axis.

This optical system, by appropriately configuring, prevents eclipse even on the reflecting surfaces, and therefore it is easier to construct an optical system using the reflecting surfaces. The off-axial optical system also features the ability to route optical paths relatively freely. Furthermore, using a reflection image-forming optical system only using surface curved mirrors makes it possible to remove almost all influences of chromatic aberration which is a problem of a refractor system.

In a projection optical system disclosed in International Publication No. WO97/01787 shown in FIG. 4, reflectors 103a, 103b, 103d and 103e having image-forming action in particular are constructed of rotationally symmetric aspherical reflectors having a common rotation axis and images are diagonally projected using the reflectors of these concave mirrors and convex mirrors partially.

However, there are restrictions on the degree of freedom, such that the surfaces should have a common axis, and therefore there are limitations to correcting aberration and brightening the reflection optical system (reducing the F number).

Furthermore, according to this projection optical system, luminous flux that has passed through an aperture-stop 103c is incident upon a convex mirror 103b and the divergent luminous flux from this convex mirror 103b is incident upon the next convex mirror 103d. For this reason, the effective diameter of the convex mirror 103d has a tendency to increase.

In this way, the distance between the reflectors of the projection image-forming optical system constructed by combining a plurality of mirrors tends to increase and the problem is that the size of the entire apparatus increases.

With regard to an image projection apparatus, a projection apparatus generally uses a transmission type liquid crystals for the image display panel. Furthermore, as an image-forming optical system used for the projection apparatus, almost all products use refraction lenses under actual circumstances. In the image-forming optical system used with this transmission type liquid crystal panel device, it is well known that the object, which is the image display panel, needs to have a telecentric optical configuration in order to improve light utilization efficiency.

Though it depends on the specification of the product, the projection image-forming optical system is generally required to be brighter than F3.0 in order to reduce the load on the illumination optical system, reduce costs and power consumption and provide optimal apparatus performance.

When an image-forming optical system constructed by combining a plurality of curved reflection mirrors is used instead of a projection image-forming system using refraction lenses, the off-axial optical system is characterized in that the off-axial optical system can set the projection angle (projection angle of elevation) high (large) more easily than the refraction optical system.

However, designing the refraction optical system with high projection angles requires an extremely wide angle of view, which results in a problem that the design becomes more difficult and the diameter of lenses increases.

Constructing an optical system by only combining surface reflection mirrors with a hollow configuration per se has an advantage of preventing influences of chromatic aberration, etc.

However, attempting to apply an image-forming optical system combining curved reflection mirrors as the projection image-forming optical system meeting requirements of the projection apparatus using the above-described liquid crystal panel involves the following problems.

In the case of a lens, which is brighter than F3.0 on the image display panel side, it is unavoidable that the effective diameter of the first mirror on the object side increases. Furthermore, as described above, since the object side is telecentric, points from which spread luminous flux is emitted in the direction perpendicular to the surface of the object are arranged side by side with the height of the object corresponding to the size of the image display panel as object points, and the effective diameter of the first mirror unavoidably increases all the more. This results in a problem that the size of the entire optical system increases.

SUMMARY OF THE INVENTION

It is an object of the present invention to provide a compact image-forming optical system used for a projection type image display apparatus and image pickup apparatus capable of projecting at a high angle of elevation when used, for example, for a projection type image display apparatus and also brightening the F number.

In order to attain the above-described object, an image-forming optical system of the present invention, provided with a plurality of curved mirrors whereby two points at different distances are made to have an optically conjugate relationship, when an optical path is traced from a first conjugate point which is nearer to a second conjugate point which is farther, in order starting with the first conjugate point, comprises the following elements. That is, the image-forming optical system comprises a first mirror which reflects luminous flux from the first conjugate point to transform the luminous flux into substantially parallel luminous flux, and a second mirror which reflects the luminous flux reflected by the first mirror while keeping the luminous flux substantially parallel.

Then, the following condition should be satisfied:

$$|Arctan(1/2F)-|2\times(\xi-\eta)|| \leq 10[deg] \quad (1)$$

where $\xi$ is an absolute value of an angle formed by the normal line of the first mirror and a reference axis at an intersection of the reference axis and the first mirror, the reference axis is an optical path along which a central ray of the luminous flux from the first conjugate point progresses, $\eta$ is an absolute value of an angle formed by the normal line of the second mirror and the reference axis at an intersection of the reference axis and the second mirror, and F is an effective F number on the first conjugate point side.

Furthermore, an image-forming optical system of the present invention, provided with a plurality of curved mirrors whereby two points at different distances are made to have an optically conjugate relationship, when an optical path is traced from a first conjugate point which is nearer to a second conjugate point which is farther, in order starting with the first conjugate point, comprises the following elements. That is, the image-forming optical system comprises a first mirror which reflects luminous flux from the first conjugate point to transform the luminous flux into substantially parallel luminous flux and a second mirror which reflects the luminous flux reflected by the first mirror while keeping the luminous flux substantially parallel.

Then, the following condition should be satisfied:

$$2.3 \geq 2 \times L1 \times \sin \eta / \Phi 1 \geq 1.1 \quad (2)$$

$$\Phi 1 = L0'/F + P \quad (3)$$

where P is a size of a conjugate surface which has a predetermined size and includes the first conjugate point within the meridional cross section, the meridional cross section is a flat plane including a reference axis which has been folded by the first and second mirrors, the reference axis is an optical path along which a central ray of the luminous flux from the first conjugate point progresses, F is an effective F number on the first conjugate point side, L0' is an air equivalent distance along the reference axis from the first conjugate point to the first mirror, L1 is an air equivalent distance along the reference axis from the first mirror to the second mirror and $\eta$ is an absolute value of an angle formed by the normal of the second mirror and the reference axis at an intersection of the reference axis and the second mirror.

Furthermore, an image-forming optical system of the present invention for sequentially reflecting and projecting luminous fluxes which are modulated by a display element using a plurality of curved mirrors, comprises the following elements.

That is, an image-forming optical system comprises a first to final (k)th mirrors provided as the above-described plurality of curved mirrors, in the order in which luminous flux progresses from the display element side. Then, the (k−1)th, (k−2)th and (k−3)th mirrors are given positive, negative and positive power, respectively and the (k)th mirror is given positive power.

Furthermore, an image-forming optical system of the present invention for sequentially reflecting and projecting luminous fluxes which are modulated by a display element using a plurality of curved mirrors, comprises the following elements. That is, an image-forming optical system comprises a first to final (k)th mirrors are provided as the above-described plurality of curved mirrors in the order in which luminous flux progresses from the display element side. Then, when a reference axis is an optical path along which a central light ray of the luminous flux from the display element progresses and distances along the reference axis from the (k−1)th and (k−2)th curved mirrors to the next (k)th and (k−1)th curved mirrors are L(k−1) and L(k−2), respectively, the following condition should be satisfied.

$$L(k-1) > L(k-2) \quad (4)$$

A detailed configuration of the image-forming optical system, projection type image display apparatus and image pickup apparatus of the invention, the above and other objects and features of the invention will be apparent from the embodiments, described below.

DETAILED DESCRIPTION OF THE PREFERRED EMBODIMENTS

Figure 1:
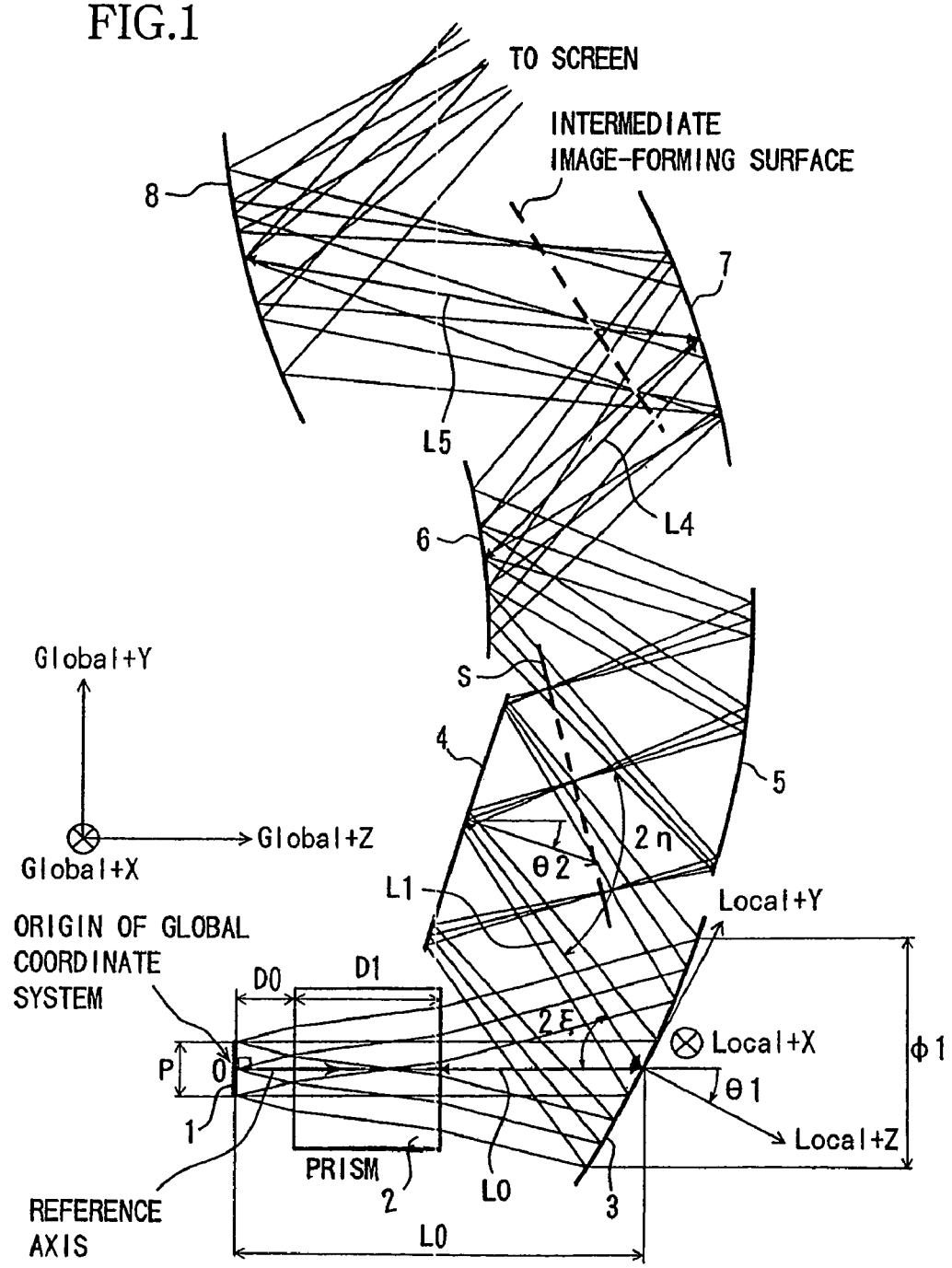
FIG. 1 is a detailed block diagram of a projection optical system of a projection type image display apparatus according to an embodiment of the present invention.

Hereinafter, preferred embodiments of the invention will be described in detail with reference to the drawings.

Before explaining embodiments of the present invention, the way of presenting the configuration specifications in the embodiments and elements common to all the embodiments will be explained.

The embodiments of the present invention will explain the case where an image-forming optical system of the present invention is mainly used as the projection optical system. In this case, the first conjugate point which is nearer corresponds to a point on an image display element and the second conjugate point which is farther corresponds to a point on a screen (a point on an image pickup medium such as an image pickup element corresponds to the first conjugate point and a point on an object corresponds to the second conjugate point in the case of an image pickup optical system). Then, each reflecting surface making up the optical system is determined in such a way that the (m)th surface in the order in which light progressing from the first conjugate point side (image display element side) to the surface of the image on the second conjugate point side (screen or projection surface side) arrives is expressed as the "(m)th surface". In the case of the projection optical system, the image display element corresponds to the object and the projection surface (screen) corresponds to the surface of the image.

Each reflecting surface is a surface mirror made up of a surface form molded with plastics, etc. coated with a reflection coating, etc. and the medium that fills the space between mirrors is air. Thus, all the embodiments are so-called hollow type optical systems.

By the way, since it is possible to give an aspheric surface power component with a diffraction grating to the surface of a spherical surface mirror by shaping at least one of the reflecting surfaces like a diffraction grating, the shape of the base mirror can be simplified in comparison with an aspheric surface (shaped) reflector.

Furthermore, by forming a plurality of free form surfaces on the back surface of a bulk of glass or plastic and forming a reflecting coating on them to use at least one reflecting surface as a backside mirror, it is also possible to provide a configuration whereby luminous flux progresses inside the bulk medium.

In order to explain the embodiments, three items; a reference axis, a global coordinate system and a local coordinate system, will be defined first.

Since the optical system according to the embodiments of the present invention is an off-axial optical system, the optical surfaces making up the optical system do not have a common optical axis. In the embodiments of the present invention, light emitted from the center of the image display element which is an object in the direction perpendicular to this image display element is a reference, and this light ray is regarded as a reference light ray. Then, the optical path along which this reference light ray progresses, that is, the optical path along which the central light ray of the luminous flux progresses from the first conjugate point is regarded as a reference axis.

The reference axis has directivity (orientation). The direction of the reference axis is the one in which the reference light ray progresses to form an image. The reference axis finally reaches the center of the surface of the image while changing the direction along the set sequence of surfaces according to the law of reflection.

Then, a global coordinate system (global coordinates are expressed by capital letters XYZ) with the center of the surface of the object which is the image display element as the origin will be considered. The axes of the global coordinate system will be defined as follows. Suppose the coordinate system is a right-hand system.

① Z-axis: A straight line which passes through the global origin and is perpendicular to the surface of the object. The direction from the surface of the object to the first mirror is considered positive.

② Y-axis: A straight line which passes through the global origin and forms 90° counterclockwise with respect to the Z-axis. This embodiment assumes that the above-described reference axis exists within the YZ plane. Therefore, all the curved mirrors making up the reflection image-forming optical system of each embodiment are tilted within the YZ plane. Furthermore, a meridional cross section coincides with the YZ plane. Furthermore, in the drawings of the respective embodiments, the plane of the sheet coincides with the YZ plane.

The orientation of the sign of the Y-axis is arbitrary. However, in the embodiments, the direction in which the reference axis is reflected and progresses by each mirror is considered positive. Therefore, the positive direction of the Y-axis in the drawing of each embodiment is upward in the drawing.

③ X-axis: A straight line which passes through the origin and is perpendicular to the Z-axis and Y-axis (straight line perpendicular to the plane of the sheet in each drawing). Since it is the right-hand system, the direction toward the back of the sheet is positive.

When expressing the shape of the (m)th surface making up the optical system, setting a local coordinate system (local coordinate system is expressed with small letters xyz) corresponding to each surface by regarding each point advanced by the distance between surfaces on the reference axis as a local origin is easier to understand the shape of each of surfaces, than expressing the shapes of the surfaces in a global coordinate system, and therefore the shape of the (m)th surface is expressed in a local coordinate system (right-hand system).

Furthermore, suppose tilting of a surface is also expressed by tilting the local coordinate system corresponding to each surface.

The tilt angle within the YZ plane of the local coordinate system corresponding to the (m)th surface is expressed with an angle θm (unit is °, which will be omitted hereafter) with the counterclockwise direction with respect to the Z-axis of the global coordinate system considered positive. Thus, all the origins of the local coordinates of the respective surfaces in the embodiments are naturally on the YZ plane.

In the embodiments, there is a relationship between ξ, and η and θm described below:

$$2\times\xi=|2\times\theta1|,\ 2\times\eta=|2\times(\theta2-2\times\theta1)|$$

Furthermore, there is no eccentricity of planes within the XZ and XY planes.

Additionally, the y-axis and z-axis of the local coordinates (x, y, z) of the (m)th surface are inclined by an angle θm within the YZ plane with respect to the global coordinate system (X, Y, Z) and are specifically set as follows:

④ z-axis: A straight line which passes through the origin of the local coordinates and is inclined by an angle θm counterclockwise within the YZ plane with respect to the Z direction in the global coordinate system.

⑤ y-axis: A straight line which passes through the origin of the local coordinates and forms 90° counterclockwise within the YZ plane with respect to the z direction.

⑥ x-axis: A straight line which passes through the origin of the local coordinates and is perpendicular to the YZ plane.

⑦ Lm is scalar indicating the distance between the origins of local coordinates of the (m)th and (m+1)th surfaces. L6 is the distance from the 6th mirror to the surface of the image.

Moreover, as described above, both the global coordinates and local coordinates use the YZ plane and yz plane as the meridional cross sections of their respective optical systems.

The optical system of the embodiments have at least a rotationally asymmetrical aspheric surface and the shape is expressed in the local coordinate system by the following expression, where C02, C20, C03, C21, C04, C22, C40, C05, C23, C41, C06, C24, C42 and C60 are aspheric surface coefficients.

$$z=C02y^2+C20x^2+C03y^3+C21x^2y+C04y^4+C22x^2y^2+C40x^4+C05y^5+C23x^2y^3+C41x^4y+C06y^6+C24x^2y^4+C42x^4y^2+C60x^6 \quad (5)$$

Since the above-described curved surface expression (5) consists of only terms of even degrees with respect to x, the curved surface specified by the above-described curved surface expression is plane-symmetric with the yz plane as the symmetric plane. The above-described curved surface expression also expresses a shape symmetric with respect to the xz plane when the following condition is satisfied:

C03=C21=C05=C23=C41=0

Furthermore, it expresses a rotationally symmetric shape when the following conditions are satisfied:

C02=C20

$C04=C40=C22/2$ $C06=C60=C24/3=C42/3$

When the above-described conditions are not satisfied, it expresses a rotationally asymmetric shape (shape of free form surface).

Then, embodiments of the present invention will be explained.

Figure 2:
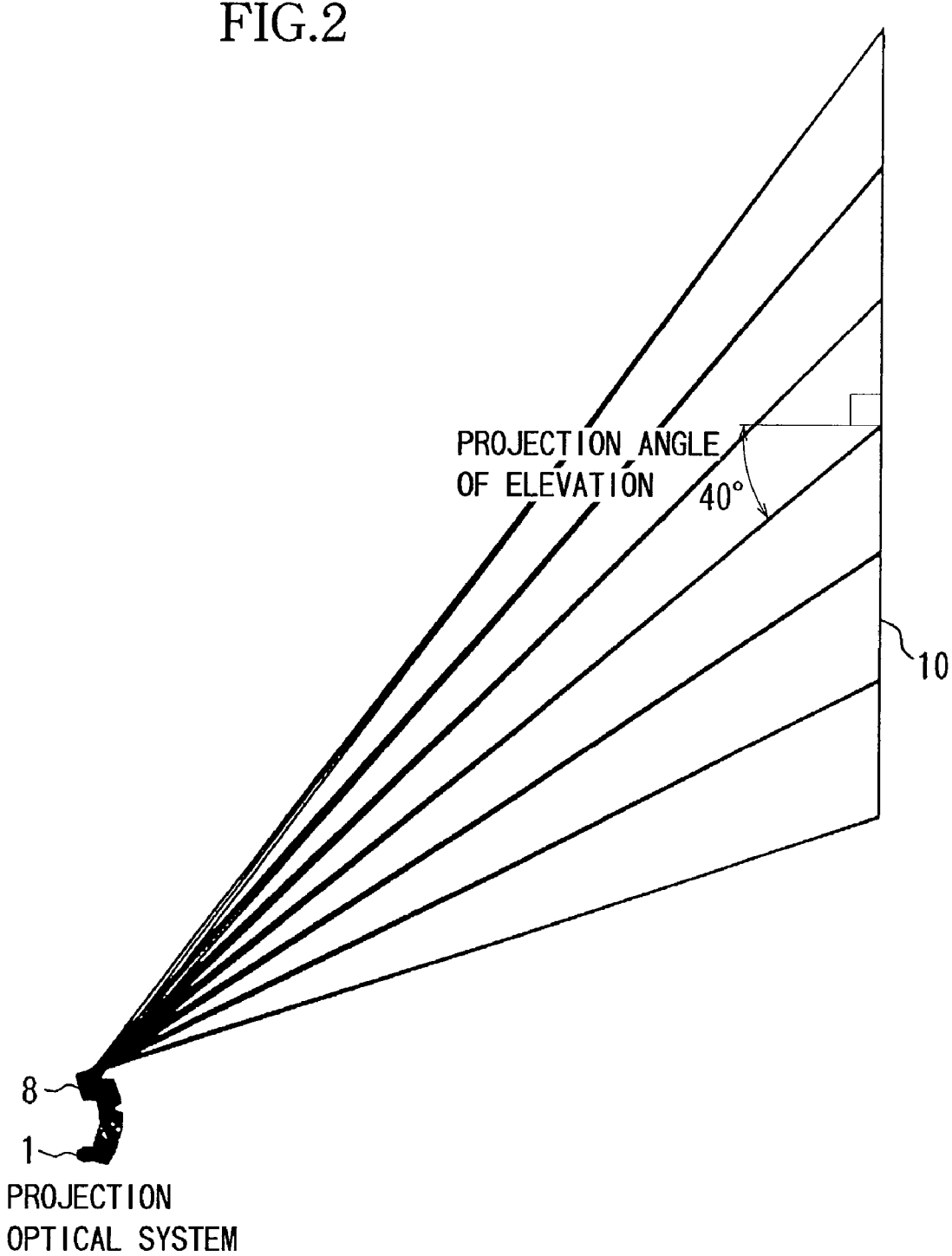
FIG. 2 is an overall block diagram of the projection optical system of the projection type image display apparatus shown in FIG. 1.

FIG. 1 and FIG. 2 show the entire optical path from the reflection projection optical system (image-forming optical system) formed of free form reflection mirrors up to a screen 10. FIG. 1 is a schematic view showing the configuration of a projection type image display apparatus using the projection optical system. FIG. 2 is an overall view of the projection optical system in FIG. 1.

With respect to numerical examples, only design values will be shown and drawings will be omitted, but they have almost the same configuration as this embodiment.

This embodiment is a projection optical system that projects light whose intensity is modulated onto the screen 10 by the image display element 1 and uses an off-axial system to form an image on the screen.

In FIG. 1, the surface of the object coincides with the surface of the image display element 1. The image display element 1 is illuminated by luminous flux emitted from an illumination system (not shown) and transmitting through the element 1 from the back. The illumination system is constructed of a lamp, condenser lens and filter for selecting a wavelength, etc. Furthermore, this embodiment has a configuration whereby three RGB image display elements are used to combine RGB three color image light components through a color combining prism 2 and project the combined light. However, FIG. 1 only shows one image display element 1.

This embodiment is constructed of six reflecting surfaces of a first mirror (concave surface) 3, second mirror (convex surface) 4, third mirror (concave surface) 5, fourth mirror (convex surface) 6, fifth mirror (concave surface) 7 and sixth mirror (concave surface) 8. An aperture-stop S is placed between the second mirror 4 and third mirror 5.

The luminous flux from the image display element 1 is reflected by the first mirror to transform into substantially parallel luminous flux and then reflected by the second mirror 4 while being kept substantially parallel.

All the above-described reflecting surfaces are only symmetric with respect to the YZ plane and rotationally asymmetric.

The luminous flux emitted from the image display element 1 forms an intermediate image on an intermediate image forming surface between the fifth mirror 7 and sixth mirror 8 and the image of the aperture-stop S is formed at a position behind the sixth mirror 8 (on the screen 10 side).

In the following numerical embodiments, the size of the image display element 1 is diagonal 0.7 inches (10.7×14.2 mm). Furthermore, the size of the screen 10 is diagonal 70 inches of an aspect ratio 3:4 (1067×1422 mm). The normal of the screen 10 is inclined 40 degrees with respect to the reference axis immediately before incidence upon the screen 10.

By the way, the projection optical system of the present invention may also be constructed to have lens systems and other reflection optical systems in addition to the optical system shown in FIG. 1 and FIG. 2.

The features of the projection optical system (image-forming optical system) of this embodiment will be explained below. Here, it is the prerequisite that the first mirror 3 is provided with power to transform the luminous flux spread from the image display element 1 to substantially parallel luminous flux and the second mirror 4 is provided with moderate power to reflect this substantially parallel luminous flux as is.

First, the projection optical system according to this embodiment satisfies the following condition:

$$|\text{Arctan}(1/2F)-|2\times(\xi-\eta)||\leq 10[\text{deg}] \quad (1)$$

where $\xi$ is an absolute value of an angle formed by the normal of the first mirror 3 (that is, the local z-axis in the first mirror 3) and the reference axis at an intersection of the reference axis and the surface of the first mirror 3, $\eta$ is an absolute value of an angle formed by the normal of the second mirror 4 (that is, the local z-axis in the second mirror 4) and the reference axis at an intersection of the reference axis and the surface of the second mirror 4, and F is an effective F number on the first conjugate point (image display element 1) side.

Expression (1) is a condition to enable luminous fluxes folded by reflections on the first mirror 3 and second mirror 4 to come as close as possible to each other.

Within the meridional cross section, a marginal light ray on the optical path from the image display element 1 to the first mirror 3 and a marginal light ray on the optical path of the luminous flux reflected by the second mirror 4 are nearly parallel on the neighboring sides, and therefore when, for example, the first mirror 3 and third mirror 5 are placed side by side, it is possible to shorten the distance between the spatial positions of these first and third mirrors, and as a result, it is possible to make a configuration of these neighboring mirrors more compact.

When F is the effective F number on the image display element 1 side of the optical system, the angle formed by the marginal light ray on the optical path from the image display element 1 to the first mirror 3 with respect to the reference axis on the same optical path is given as:

$$\text{Arctan}(1/2F) \quad (1\text{-a})$$

The luminous flux from the first mirror 3 at the height of each object is converged into substantially parallel luminous flux and reaches the second mirror 4. Then the luminous flux reflected by the second mirror 4 forms the following angle with respect to the reference axis:

$$2\times(\xi-\eta) \quad (1\text{-b})$$

The luminous flux reflected by the second mirror 4 is substantially parallel luminous flux, and therefore the marginal light ray also has a similar angle.

At this time, if the marginal light rays on the neighboring sides are nearly parallel to each other, that is, the difference in absolute values of the angles shown in expressions (1-a) and (1-b) is set to 10° or less including certain margins, it is possible to bring the optical path from the image display element 1 to the first mirror 3 sufficiently close to the optical path of the luminous flux reflected by the second mirror 4 without interfering with each other.

Thus, from expressions (1-a) and (1-b), the above-described expression (1) is obtained as the conditional expression concerning the absolute value of the angle.

Then, when P is the size of the display surface of the image display element 1 within the meridional cross section, F is an effective F number on the image display element 1 side of the optical system, L0' is an air equivalent distance along the reference axis from the image display element 1 to the first mirror 3, and L1 is an air equivalent distance along the reference axis from the first mirror 3 to the second mirror 4, the following condition should be satisfied:

$$2.3 \geq 2 \times L1 \times \sin \eta / \Phi 1 \geq 1.1 \qquad (2)$$

$$\text{where, } \Phi 1 = L0'/F + P \qquad (3)$$

Expression (2) indicates the condition for preventing each mirror from becoming too large and setting each mirror to a size within the necessary minimum range so that luminous fluxes do not interfere with each other. $\Phi 1$ indicated by Expression (3) is an approximation of the effective diameter of luminous flux in the meridional section of the image display element 1 on the first mirror 3.

By the way, when a prism (e.g., color combining prism), etc. is placed on the optical path between the image display element 1 and the first mirror 3, the above-described air equivalent distance L0' can be calculated as:

$$L0' = D0 + D1/N + L0 \qquad (2\text{-a})$$

where D1 is a thickness of the prism measured along the reference axis, N is a refraction index of the glass of the prism, D0 is a distance measured along the reference axis from the image display element 1 to the prism incident end and L0 is a distance measured along the reference optical axis from the prism exiting end to the first mirror 3.

Furthermore, $$2 \times L1 \times \sin \eta \qquad (2\text{-b})$$

indicates an approximate distance of the light ray (reference light ray) on the reference axis, which progresses after being reflected at the center of the first mirror 3 and reflected by the second mirror 4, from the center of the first mirror 3 when this light ray passes right next to the first mirror 3.

In the case where the above-described third mirror 5 is provided as described in this embodiment, the third mirror 5 is often necessarily placed next to the first mirror 3 on the substantially same plane in order to design a compact optical system. In this case, the value in above-described expression (2-b) is a value that can be said to be the distance between the center of the first mirror 3 and the center of the third mirror 5.

If the distance according to above-described expression (2-b) is too long, the first mirror 3 is distant from the third mirror 5, which increases the size of the optical system. If the distance is too short, the luminous flux on the first mirror 3 overlaps with the luminous flux of the third mirror 5, failing to establish the optical system.

Since luminous flux is transformed to substantially parallel luminous flux by the first mirror 3 and the second mirror 4 has only weak power that preserves the condition, the diameter of luminous flux on the first mirror 3 is almost equivalent to the diameter of luminous flux on the third mirror 5.

Therefore, the following expression (2-c) expresses the magnitude of the value in expression (2-b) corresponding to the value in expression (3), that is, the distance from the center the first mirror 3 to the center of the third mirror 5 (reference axis of the reflection optical path from the second mirror 4) corresponding to the effective diameter of luminous flux on the first mirror 3.

If:

$$2 \times L1 \times \sin \eta / \Phi 1 \qquad (2\text{-c})$$

is within the range of 1.1 times to a maximum of 2.3 times (that is, if above-described expression (2) is satisfied) including various margins, it is possible to provide an optical system of an appropriate size which is not too large or which prevents luminous fluxes from interfering with each other.

Furthermore, in this embodiment, when the first to final (k)th mirrors are provided, in the order in which luminous flux progresses from the image display element 1 side, the (k−1)th, (k−2)th and (k−3)th mirrors are given positive, negative and positive power, respectively and the (k)th mirror is given positive power.

Thus, arranging the three mirrors immediately before the final mirror as positive, negative and positive, that is, concave, convex and concave mirrors provides a power configuration similar to the Offner type, which is known to be non-aberration optical system with a reflection type equimultiple exposure apparatus, etc. This makes it unlikely to cause unnecessary adverse influences on luminous fluxes whose aberration has been corrected by mirrors immediately before the three mirrors. Further, making the surfaces of these three mirrors rotationally asymmetric (free form surfaces) allows the residual aberration components that have not been successfully removed from the surfaces before the above-described three mirrors to be effectively corrected.

Then, as it is known that using a positive or concave mirror as the final mirror is advantageous in correcting aberration for projection at a high angle of elevation, it is possible to form an image of the aperture-stop after the final mirror (projection surface side).

Furthermore, when the distances along the reference axis from the (k−1)th and (k−2)th curved mirrors to the next (k)th and (k−1)th curved mirrors are L(k−1) and L(k−2), respectively, the following condition should be satisfied.

$$L(k-1) > L(k-2) \qquad (4)$$

In the case of projection at a high angle of elevation, forming an image of the aperture-stop after the final mirror is known to be advantageous in correcting aberration of the optical system. And this expression (4) is expressed also as an effective condition to prevent spatial interference between the luminous flux reflected by the final mirror and directed to the projection surface, and the edge of the preceding mirror.

Furthermore, in the case where a concave mirror is used for the final mirror, spatially separating the light rays forming respective portions of an angle of view on this concave surface as much as possible, when the light rays are reflected on the concave surface, is advantageous in correcting aberration. This has an effect of making it easier to correct aberration remaining for each portions of the angle of view through control of local surface shapes on the final mirror and correct distortion of the diagonally projected image by controlling the curvature of the field.

As the configuration condition for this, when the system is constructed of a total of k surfaces and the distances along the reference axis from the (k−1)th and (k−2)th curved mirrors to the next (k)th and (k−1)th curved mirrors are L(k−1) and L(k−2), the above-described expression (4) should be satisfied.

Satisfying this condition makes it possible to place only the final mirror at a place more distant from the immediately preceding mirror with regard to distances among the mirrors. This produces an extra space for the space around the final mirror, avoiding interference in configuration such as eclipse of luminous flux or making it easier to adopt a configuration for reflecting luminous flux while keeping a tendency of separating luminous flux at each portion of the angle of view on the surface of the final mirror.

By satisfying the above-described conditions, it is possible to realize an image-forming optical system suitable as the image-forming optical system for a projection type image display apparatus especially using a transmission type image display element, only made up of reflecting surfaces combining a plurality of curved mirrors, whose object side is substantially telecentric, bright (e.g., brighter than F3.0), avoiding size expansion of the mirrors and capable of projection at a high angle of elevation.

Numerical embodiments of the present invention will be shown below. In all the numerical embodiments:

① The total number of reflection curved surfaces is 6.

② The distance D0 from the surface of an object (image display element 1) to the color combining prism 2 is 11.0 mm.

③ The thickness D1 of the color combining prism 2 is 28.0 mm.

④ The refraction index Nd of the color combining prism 2 is 1.872690 and Abbe's number vd is 32.33.

⑤ The distance L0 from the exiting end surface of the prism 2 to the local coordinate origin of the first mirror 3 is 40.0 mm.

(Numerical Embodiment 1)

Table 1 shows design values according to numerical embodiment 1. Configuration data is numbered sequentially from the surface of the image display element 1 to the surface of the image (surface of the screen 10). The F number on the object side is 2.0.

TABLE 1

| 1st Mirror | | L 1 | 60 | θ 1 | −27 |
|---|---|---|---|---|---|
| C2 | −2.62990E−03 | C3 | −2.16320E−07 | C4 | −1.20530E−07 |
| C5 | −1.49020E−09 | C6 | −1.36120E−11 | C20 | −1.59860E−03 |
| C21 | −1.06840E−05 | C22 | −1.47820E−07 | C23 | −6.39140E−11 |
| C24 | 2.09980E−11 | C40 | −1.12010E−07 | C41 | −1.06060E−09 |
| C42 | −2.51680E−11 | C60 | −2.01920E−11 | | |
| 2nd Mirror | | L 2 | 58 | θ 2 | −17 |
| C2 | 2.57220E−04 | C3 | −1.26550E−05 | C4 | −1.68350E−07 |
| C5 | −1.37600E−09 | C6 | −2.05140E−11 | C20 | 6.90530E−04 |
| C21 | −1.29610E−05 | C22 | −1.45430E−07 | C23 | −2.12890E−09 |
| C24 | −2.81640E−11 | C40 | −1.00680E−07 | C41 | −1.71720E−09 |
| C42 | −3.23350E−11 | C60 | −4.62060E−12 | | |
| 3rd Mirror | | L 3 | 60 | θ 3 | −6 |
| C2 | −2.88920E−03 | C3 | −1.27960E−05 | C4 | 8.15880E−08 |
| C5 | −1.26220E−09 | C6 | 8.58590E−13 | C20 | −3.93300E−03 |
| C21 | −4.86140E−06 | C22 | 4.39810E−08 | C23 | −3.36290E−09 |
| C24 | 1.91890E−11 | C40 | −3.49090E−08 | C41 | −1.04590E−09 |
| C42 | 9.92250E−12 | C60 | −5.89450E−13 | | |
| 4th Mirror | | L 4 | 60 | θ 4 | +7 |
| C2 | −4.66820E−03 | C3 | −2.20370E−06 | C4 | 4.58740E−07 |
| C5 | −4.70960E−09 | C6 | −8.87360E−11 | C20 | −7.09870E−04 |
| C21 | 1.03720E−04 | C22 | −4.49650E−07 | C23 | −3.48160E−08 |
| C24 | 1.81040E−10 | C40 | −4.09900E−08 | C41 | −1.14720E−08 |
| C42 | 4.39340E−10 | C60 | −1.37690E−10 | | |
| 5th Mirror | | L 5 | 90 | θ 5 | +18 |
| C2 | −2.87050E−03 | C3 | −4.52490E−07 | C4 | −2.48480E−08 |
| C5 | −8.63240E−10 | C6 | 1.23230E−11 | C20 | −1.14370E−02 |
| C21 | 5.48810E−05 | C22 | −6.98790E−07 | C23 | 4.50210E−09 |
| C24 | −7.34250E−11 | C40 | −9.51650E−07 | C41 | 1.28360E−08 |
| C42 | −2.39830E−10 | C60 | 2.20530E−11 | | |
| 6th Mirror | | L 6 | 2360 | θ 6 | +15 |
| C2 | 3.11270E−03 | C3 | −2.39510E−05 | C4 | 3.15000E−07 |
| C5 | −3.11740E−09 | C6 | 1.50310E−11 | C20 | −1.10200E−03 |
| C21 | −1.48510E−05 | C22 | −3.39740E−07 | C23 | 5.01470E−09 |
| C24 | −7.54510E−11 | C40 | −9.93860E−08 | C41 | 9.25250E−10 |
| C42 | 4.09830E−11 | C60 | 2.63620E−11 | | |

(Numerical Embodiment 2)

Table 2 shows design values according to numerical embodiment 2. The F number on the object side is 2.2.

TABLE 2

| 1st Mirror | | L 1 | 60 | θ 1 | −27 |
|---|---|---|---|---|---|
| C2 | −3.45470E−03 | C3 | −3.43110E−06 | C4 | −1.18920E−07 |
| C5 | −1.10840E−09 | C6 | −1.75660E−11 | C20 | −3.86300E−03 |
| C21 | −2.80060E−05 | C22 | −4.51860E−07 | C23 | −2.65260E−09 |
| C24 | −1.78960E−11 | C40 | 1.13220E−07 | C41 | −1.85280E−09 |
| C42 | −6.53940E−11 | C60 | 5.04350E−11 | | |
| 2nd Mirror | | L 2 | 58 | θ 2 | −17 |
| C2 | −8.95970E−05 | C3 | −1.16880E−05 | C4 | −2.46060E−07 |
| C5 | −2.31260E−09 | C6 | −5.05480E−11 | C20 | −7.08200E−03 |
| C21 | −7.05900E−05 | C22 | −7.00660E−07 | C23 | −7.54210E−09 |
| C24 | −1.17420E−10 | C40 | 2.30970E−07 | C41 | −1.04850E−09 |
| C42 | −7.24290E−11 | C60 | 1.76270E−10 | | |
| 3rd Mirror | | L 3 | 60 | θ 3 | −6 |
| C2 | −2.97790E−03 | C3 | −1.31910E−05 | C4 | 4.97300E−08 |
| C5 | −9.14870E−10 | C6 | −4.76540E−12 | C20 | −5.95630E−03 |
| C21 | 1.40430E−07 | C22 | −1.76920E−07 | C23 | −1.80170E−09 |
| C24 | 2.84940E−12 | C40 | −1.97720E−07 | C41 | 9.89490E−11 |
| C42 | −1.36170E−11 | C60 | −1.31600E−11 | | |
| 4th Mirror | | L 4 | 60 | θ 4 | 7 |
| C2 | −3.22570E−03 | C3 | −5.14890E−06 | C4 | 3.03330E−07 |
| C5 | −2.94870E−09 | C6 | 4.21640E−11 | C20 | −2.32130E−03 |
| C21 | 1.62720E−04 | C22 | −1.37010E−06 | C23 | 9.54750E−09 |
| C24 | −1.38730E−10 | C40 | −3.60700E−07 | C41 | −3.32270E−08 |
| C42 | 5.26710E−10 | C60 | 3.74070E−10 | | |
| 5th Mirror | | L 5 | 90 | θ 5 | 18 |
| C2 | −3.23350E−03 | C3 | 4.40360E−06 | C4 | 1.50230E−08 |
| C5 | 5.95530E−10 | C6 | 5.44740E−12 | C20 | −1.13810E−02 |
| C21 | −1.24900E−05 | C22 | 3.15290E−07 | C23 | 3.29840E−10 |
| C24 | 7.28890E−12 | C40 | −9.66530E−07 | C41 | −5.75770E−09 |
| C42 | 2.69510E−10 | C60 | −2.18500E−10 | | |
| 6th Mirror | | L 6 | 2360 | θ 6 | 15 |
| C2 | 1.34650E−03 | C3 | −1.68040E−06 | C4 | 9.91660E−08 |
| C5 | −1.55470E−09 | C6 | 1.11750E−11 | C20 | −1.14430E−04 |
| C21 | −7.55550E−06 | C22 | 1.11850E−07 | C23 | 7.43030E−10 |
| C24 | −3.55670E−11 | C40 | 1.54350E−07 | C41 | 5.83010E−09 |
| C42 | 2.29590E−11 | C60 | −5.96550E−12 | | |

(Numerical Embodiment 3)

Table 3 shows design values according to numerical embodiment 3. The F number on the object side is 2.5.

TABLE 3

| 1st Mirror | | L 1 | 60 | θ 1 | −27 |
|---|---|---|---|---|---|
| C2 | −2.82290E−03 | C3 | −8.39020E−06 | C4 | −2.15920E−07 |
| C5 | −1.73820E−09 | C6 | −1.18040E−11 | C20 | −2.92540E−03 |
| C21 | −2.56290E−05 | C22 | 1.77300E−08 | C23 | 2.67590E−09 |
| C24 | 1.17010E−11 | C40 | 5.95940E−08 | C41 | −2.55510E−09 |
| C42 | −4.38720E−11 | C60 | 1.72090E−11 | | |
| 2nd Mirror | | L 2 | 58 | θ 2 | −17 |
| C2 | 6.15930E−05 | C3 | −2.04790E−05 | C4 | −2.61300E−07 |
| C5 | −3.05570E−09 | C6 | −4.74500E−11 | C20 | −2.76560E−03 |
| C21 | −1.07810E−05 | C22 | 4.56360E−07 | C23 | 7.40050E−09 |
| C24 | 9.86610E−11 | C40 | 5.81510E−08 | C41 | 7.63600E−10 |
| C42 | 2.34840E−11 | C60 | 2.62710E−11 | | |

TABLE 3-continued

| 3rd Mirror | | L 3 | 60 | θ 3 | -6 |
|---|---|---|---|---|---|
| C2 | -2.47730E-03 | C3 | -1.69230E-05 | C4 | 1.07440E-07 |
| C5 | -1.48060E-09 | C6 | -3.79440E-12 | C20 | -5.26230E-03 |
| C21 | 7.37020E-06 | C22 | 1.07850E-07 | C23 | -2.48380E-09 |
| C24 | 4.52080E-11 | C40 | -1.42710E-07 | C41 | 4.94900E-10 |
| C42 | 4.14600E-11 | C60 | -7.30370E-12 | | |
| 4th Mirror | | L 4 | 60 | θ 4 | 7 |
| C2 | -2.03880E-03 | C3 | -2.71950E-08 | C4 | 1.18910E-07 |
| C5 | -1.99550E-09 | C6 | -3.81030E-11 | C20 | -1.44660E-03 |
| C21 | 1.87520E-04 | C22 | -8.91840E-07 | C23 | -3.74300E-09 |
| C24 | 9.17790E-11 | C40 | -2.20620E-06 | C41 | -4.66870E-08 |
| C42 | 9.73520E-10 | C60 | 1.76210E-09 | | |
| 5th Mirror | | L 5 | 90 | θ 5 | 18 |
| C2 | -1.68920E-03 | C3 | 2.01510E-06 | C4 | -1.62160E-07 |
| C5 | -1.10580E-09 | C6 | 1.88300E-11 | C20 | -1.06760E-02 |
| C21 | 2.38450E-05 | C22 | -8.61220E-08 | C23 | -4.13700E-09 |
| C24 | -5.56080E-11 | C40 | -7.14770E-07 | C41 | 3.19510E-09 |
| C42 | -8.22270E-11 | C60 | -8.16020E-11 | | |
| 6th Mirror | | L 6 | 2360 | θ 6 | 15 |
| C2 | 3.65330E-03 | C3 | -2.17560E-05 | C4 | 2.66200E-07 |
| C5 | -2.74490E-09 | C6 | 1.44350E-11 | C20 | -2.71280E-03 |
| C21 | -3.02460E-06 | C22 | -4.83180E-07 | C23 | 5.47270E-09 |
| C24 | -7.46490E-11 | C40 | 6.47570E-07 | C41 | 4.93880E-09 |
| C42 | 2.53670E-10 | C60 | -1.76960E-10 | | |

(Numerical Embodiment 4)

Table 4 shows design values according to numerical embodiment 4. The F number on the object side is 2.8.

TABLE 4

| 1st Mirror | | L 1 | 60 | θ 1 | -27 |
|---|---|---|---|---|---|
| C2 | -2.8898E-03 | C3 | -7.8773E-06 | C4 | -2.0967E-07 |
| C5 | -1.7026E-09 | C6 | -1.3058E-11 | C20 | -2.8814E-03 |
| C21 | -2.4490E-05 | C22 | 5.8433E-08 | C23 | 3.4577E-09 |
| C24 | 1.6376E-11 | C40 | 9.1834E-08 | C41 | -2.6967E-09 |
| C42 | -3.4943E-11 | C60 | 3.2961E-11 | | |
| 2nd Mirror | | L 2 | 58 | θ 2 | -17 |
| C2 | 5.0246E-05 | C3 | -1.9943E-05 | C4 | -2.5939E-07 |
| C5 | -2.8618E-09 | C6 | -4.8075E-11 | C20 | -2.8115E-03 |
| C21 | -5.9288E-06 | C22 | 5.7097E-07 | C23 | 8.8495E-09 |
| C24 | 1.1055E-10 | C40 | 7.4373E-08 | C41 | 1.1162E-09 |
| C42 | 2.6441E-11 | C60 | 3.1819E-11 | | |
| 3rd Mirror | | L 3 | 60 | θ 3 | -6 |
| C2 | -2.4331E-03 | C3 | -1.7384E-05 | C4 | 1.1195E-07 |
| C5 | -1.4727E-09 | C6 | -5.4818E-12 | C20 | -5.3683E-03 |
| C21 | 8.8846E-06 | C22 | 1.3012E-07 | C23 | -2.2319E-09 |
| C24 | 4.8964E-11 | C40 | -1.5317E-07 | C41 | 7.2041E-10 |
| C42 | 4.6359E-11 | C60 | -8.3890E-12 | | |
| 4th Mirror | | L 4 | 60 | θ 4 | 7 |
| C2 | -1.9285E-03 | C3 | -9.3206E-07 | C4 | 1.3423E-07 |
| C5 | -2.0951E-09 | C6 | -4.4435E-11 | C20 | -2.3054E-03 |
| C21 | 2.1589E-04 | C22 | -1.0703E-06 | C23 | -2.8856E-09 |
| C24 | 8.3340E-11 | C40 | -2.5050E-06 | C41 | -5.6641E-08 |
| C42 | 1.2383E-09 | C60 | 2.2638E-09 | | |
| 5th Mirror | | L 5 | 90 | θ 5 | 18 |
| C2 | -1.5474E-03 | C3 | 2.5468E-06 | C4 | -1.8768E-07 |
| C5 | -1.5289E-09 | C6 | 2.3362E-11 | C20 | -1.0472E-02 |
| C21 | 1.9738E-05 | C22 | 1.6806E-08 | C23 | -4.6789E-09 |
| C24 | -6.4027E-11 | C40 | -7.1077E-07 | C41 | 2.4256E-09 |

TABLE 4-continued

| C42 | -4.9469E-11 | C60 | -1.1212E-10 | | |
|---|---|---|---|---|---|
| 6th Mirror | | L 6 | 2360 | θ 6 | 15 |
| C2 | 3.5875E-03 | C3 | -2.0414E-05 | C4 | 2.4500E-07 |
| C5 | -2.4251E-09 | C6 | 1.1429E-11 | C20 | -2.7382E-03 |
| C21 | -1.9202E-06 | C22 | -4.9902E-07 | C23 | 5.3182E-09 |
| C24 | -7.0459E-11 | C40 | 6.8669E-07 | C41 | 4.8212E-09 |
| C42 | 2.8058E-10 | C60 | -2.0137E-10 | | |

Here, the calculation results of the above-described expressions (1) and (4) in the above-described numerical embodiments are shown.

TABLE 5

| Expression (1) | | | | a | b | ≦10° | |
|---|---|---|---|---|---|---|---|
| | F | ξ | η | Arctan (1/2F) | |2(ξ − η)| | |a − b| | Judgement |
| Embodiment 1 | 2.0 | 27 | 37 | 14.036 | 20 | 5.9638 | available |
| Embodiment 2 | 2.2 | 27 | 37 | 12.804 | 20 | 7.1957 | available |
| Embodiment 3 | 2.5 | 27 | 37 | 11.310 | 20 | 8.6901 | available |
| Embodiment 4 | 2.8 | 27 | 37 | 10.125 | 20 | 9.8753 | available |

TABLE 6

| Expression (4) | | | | | | | | | | | 2.3 ≦ Expression ≦ 1.1 | |
|---|---|---|---|---|---|---|---|---|---|---|---|---|
| | D0 | D1 | N | L0 | F | P | φ1 | L1 | η | 2L1sinη | 2L1sinη/φ1 | Judgement |
| Embodiment 1 | 11 | 28 | 1.87269 | 40 | 2.0 | 5.4 | 38.376 | 60 | 37 | 72.2178 | 1.882 | available |
| Embodiment 2 | 11 | 28 | 1.87269 | 40 | 2.2 | 6.4 | 36.378 | 60 | 37 | 72.2178 | 1.985 | available |
| Embodiment 3 | 11 | 28 | 1.87269 | 40 | 2.5 | 7.4 | 33.781 | 60 | 37 | 72.2178 | 2.138 | available |
| Embodiment 4 | 11 | 28 | 1.87269 | 40 | 2.8 | 8.4 | 31.954 | 60 | 37 | 72.2178 | 2.260 | available |

The above embodiments have described the projection type image display apparatuses, but the present invention is also applicable to an image pickup optical system.

Figure 3:
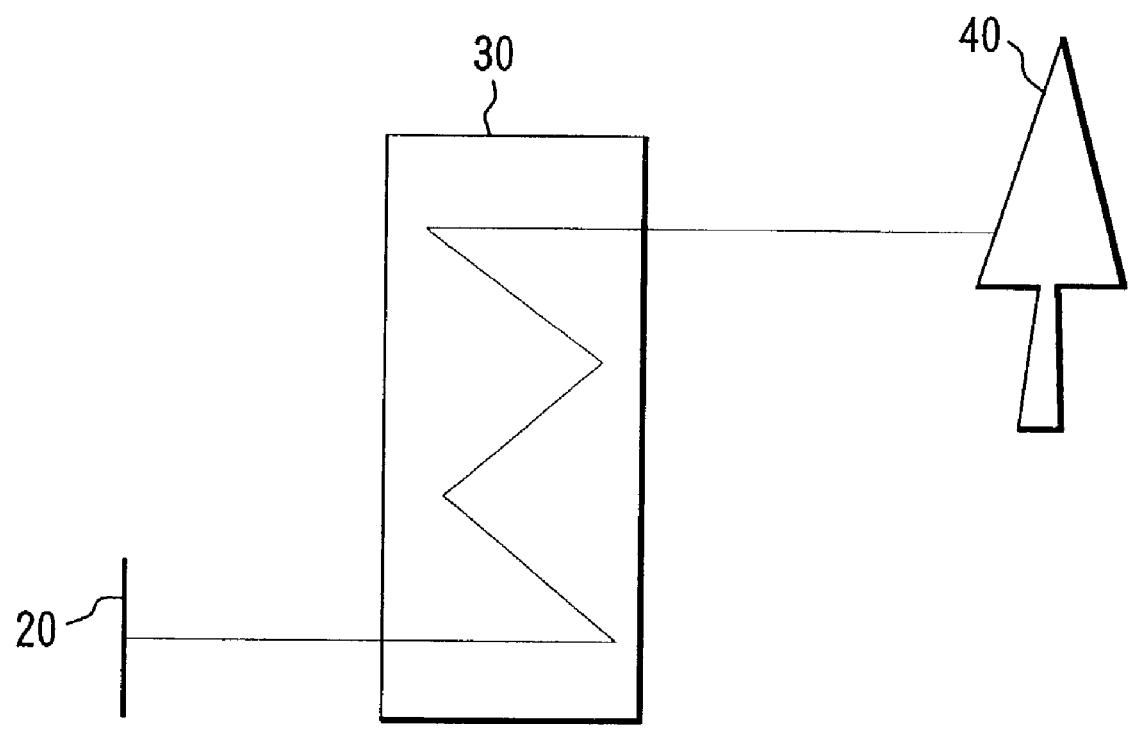
FIG. 3 is a block diagram of an image pickup apparatus according to another embodiment of the present invention.
Figure 4:
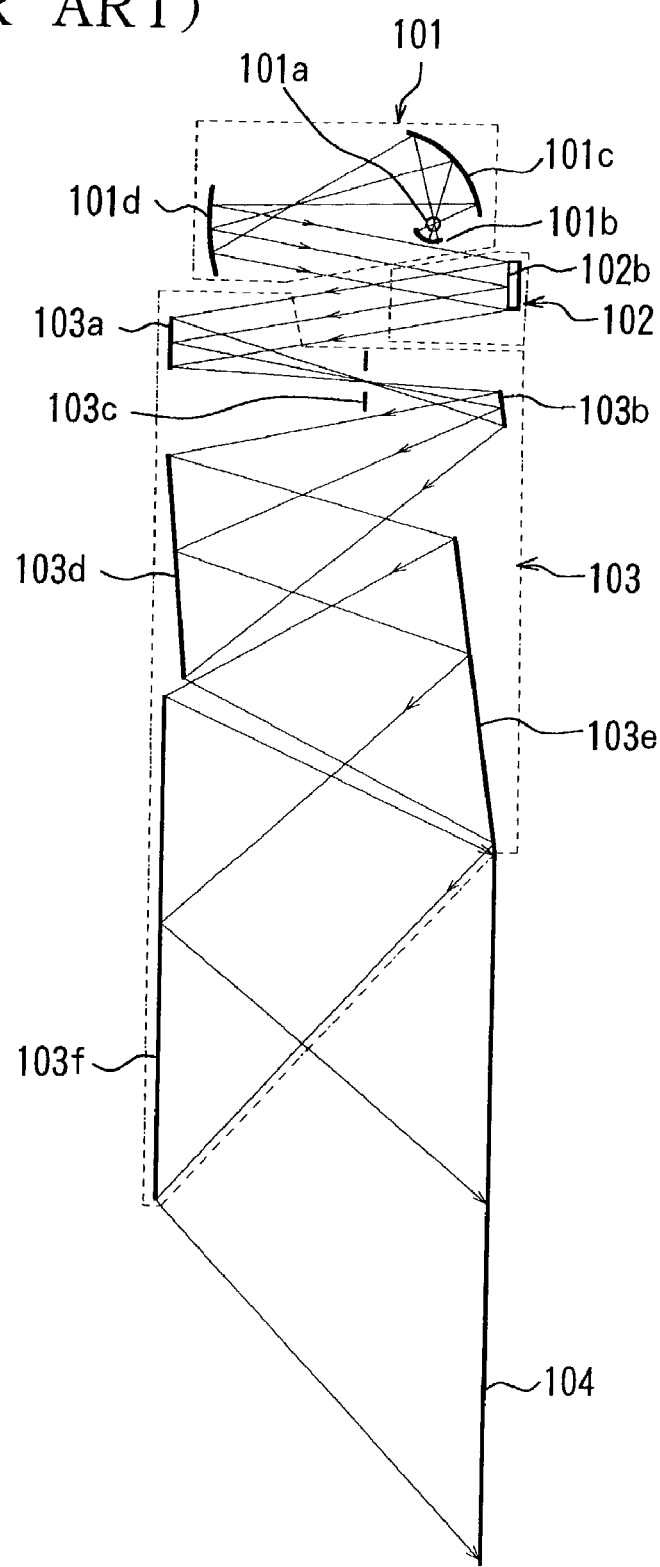
FIG. 4 is a block diagram of a conventional projection optical system.

When an image-forming optical system of the present invention is used as an image pickup optical system, as shown in FIG. 3, the positions of the object and image of the above-described optical system can be switched round. Then, the image display element may be replaced by an image pickup element 20 such as a CCD or CMOS sensor, and the image of the object 40 is formed on the image pickup element 20 through 30 by the image-forming optical system according to the invention. In the case where a color CCD is used as the image pick element 20, color images can be taken by a single CCD, and therefore no prism is required. Further, changing the specification as appropriate according to the operating conditions such as shortening the focal length compared to the projection type image display apparatus makes it possible to realize an apparatus to read a document placed on a flat surface from diagonal direction as in the case of an art camera. In addition, the present invention can also be used as a general image pickup apparatus such as a monitoring camera.

When the image-forming optical system is used for an image pickup system, the image pickup system has the merit of producing no color aberration as far as the system is a surface reflection system as in the case of a projection system.

For example, the prism for combining RGB three-color liquid crystal images for the projection type image display apparatus can be changed to a cover glass (a thin plate of approximately 0.7 mm in thickness) of the CCD.

To be precise, since the above-described prism and cover glass are refraction elements, color aberration may be generated there, but the operating conditions are limited in a projection system, and therefore it is possible to remove influences of color aberration through an adjustment and make the most of the feature of being free of color aberration of the reflection image-forming optical system.

On the other hand, in the case of the image pickup system, conditions such as image pickup distance may vary, etc., but the cover glass is thin, and therefore little color aberration is generated here and there are possibly no substantial influences.

As described above, according to the present invention, it is possible to bring luminous fluxes folded by reflections on the first mirror and second mirror of the image-forming optical system close to each other without interference with each other and thereby reduce the size of the image-forming optical system made up of only reflecting surfaces.

Furthermore, the present invention can prevent the mirrors from becoming too big and reduce them to within a minimum necessary range preventing luminous fluxes from interfering with each other and thereby reduce the size of the image-forming optical system.

Moreover, the three positive, negative and positive mirrors before the final mirror can optimally correct various aberrations and use of a positive mirror for the final mirror can form an image of the aperture-stop after the final mirror (projection surface side), which is advantageous in correcting aberration for projection at a high angle of elevation.

Furthermore, when an image of the aperture-stop is formed after the final mirror, the image-forming optical system can prevent spatial interference between the luminous flux directed to the projection surface and the edge of the mirror immediately before the final mirror.

For the above-described reasons is it possible to realize an image-forming optical system which is especially suitable for the projection type image display apparatus using a transmission type image display element. Further, it is possible to realize an image-forming optical system which is made up of only reflecting surfaces by a combination of a plurality of curved mirrors and whose object side is substantially telecentric, bright, preventing expansion in the size of mirrors, capable of projection at a high angle of elevation.

While preferred embodiments have been described, it is to be understood that modification and variation of the present invention may be made without departing from the sprit or scope of the following claims.

What is claimed is:

1. An image forming optical system provided with a plurality of curved mirrors whereby a first conjugate point and a second conjugate point are made to have an optically conjugate relationship, when an optical path is traced from said first conjugate point to said second conjugate point, in order starting with said first conjugate point, comprising:
   a first mirror with an optical power which reflects luminous flux from said first conjugate point to transform the luminous flux into substantially parallel luminous flux;
   a second mirror with an optical power which reflects the luminous flux reflected by said first mirror while keeping said luminous flux substantially parallel;
   a third mirror with an optical power which reflects the luminous flux from said second mirror;
   a fourth mirror with an optical power which reflects the luminous flux from said third mirror;
   a fifth mirror with an optical power which reflects the luminous flux from said fourth mirror; and
   a sixth mirror with an optical power which reflects the luminous flux from said fifth mirror,
   wherein the following condition is satisfied:

$|Arctan(1/2F)-|2\times(\xi-\eta)|| \leq 10[deg]$ where $\xi$ is an absolute value of an angle formed by the normal of said first mirror and a reference axis at an intersection of said reference axis and said first mirror, said reference axis is an optical path along which a central ray of the luminous flux from said first conjugate point progresses, $\eta$ is an absolute value of an angle formed by the normal of said second mirror and said reference axis at an intersection of said reference axis and said second mirror, and F is an effective F number on said first conjugate point side, and
   wherein a third conjugate point having an optically conjugate relationship with said first and second conjugate points is formed between an optical path of said fifth mirror and said sixth mirror.

2. The image-forming optical system according to claim 1, wherein said third mirror converges the light flux reflected by said second mirror.

3. The image-forming optical system according to claim 1, wherein the reflecting surface of at least one of said plurality of curved mirrors is a rotationally asymmetric surface.

4. A projection type image display apparatus comprising:
   a plurality of display elements which display original images;
   a prism which combines luminous fluxes from said plurality of display elements; and
   the image-forming optical system according to claim 1 which projects the luminous fluxes from said prism onto a projection surface.

5. An image pickup apparatus comprising:
   an image pickup element which optical/electrical-converts of an object image; and
   the image-forming optical system according to claim 1 which forms the object image on said image pickup element.

6. An image-forming optical system provided with a plurality of curved mirrors whereby a first conjugate point and a second conjugate point are made to have an optically conjugate relationship, when an optical path is traced from said first conjugate point to said second conjugate point, in order starting with said first conjugate point, comprising:
   a first mirror with an optical power which reflects luminous flux from said first conjugate point;
   a second mirror with an optical power which reflects the luminous flux reflected by said first mirror;
   a third mirror with an optical power which reflects the luminous flux from said second mirror;
   a fourth mirror with an optical power which reflects the luminous flux from said third mirror;
   a fifth mirror with an optical power which reflects the luminous flux from said fourth mirror; and
   a sixth mirror with an optical power which reflects the luminous flux from said fifth mirror,
   wherein the following condition is satisfied:

$|Arctan(1/2F)-|2\times(\xi-\eta)|| \leq 10[deg]$ where $\xi$ is an absolute value of an angle formed by the normal of said first mirror and a reference axis at an intersection of said reference axis and said first mirror, said reference axis is an optical path along which a central ray of the luminous flux from said first conjugate point progresses, $\eta$ is an absolute value of an angle formed by the normal of said second mirror and said reference axis at an intersection of said reference axis and said second mirror, and F is an effective F number on said first conjugate point side, and
   wherein a third conjugate point having an optically conjugate relationship with said first and second conjugate points is formed between an optical path of said fifth mirror and said sixth mirror.

7. A projection type image display apparatus comprising:
   a plurality of display elements which display original images;
   a prism which combines luminous fluxes from said plurality of display elements; and
   the image-forming optical system according to claim 6 which projects the luminous fluxes from said prism onto a projection surface.

8. An image pickup apparatus comprising: an image pickup element which optical/electrical converts of an object image; and
   the image-forming optical system according to claim 6 which forms the object image on said image pickup element.

* * * * *